(12) United States Patent
Kosov et al.

(10) Patent No.: US 8,145,653 B2
(45) Date of Patent: Mar. 27, 2012

(54) USING SCHEMAS TO GENERATE APPLICATION SPECIFIC BUSINESS OBJECTS FOR USE IN AN INTEGRATION BROKER

(75) Inventors: Yury Kosov, San Francisco, CA (US); Thomas Pollinger, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 11/102,025

(22) Filed: Apr. 8, 2005

(65) Prior Publication Data
US 2006/0230066 A1 Oct. 12, 2006

(51) Int. Cl.
*G06F 7/00* (2006.01)
*G06F 17/30* (2006.01)
*G06F 9/44* (2006.01)

(52) U.S. Cl. ........................................ 707/756; 717/120
(58) Field of Classification Search .................. None
See application file for complete search history.

(56) References Cited

U.S. PATENT DOCUMENTS

| | | | |
|---|---|---|---|
| 5,542,078 A | 7/1996 | Martel et al. | |
| 5,937,402 A * | 8/1999 | Pandit | 707/4 |
| 6,256,676 B1 * | 7/2001 | Taylor et al. | 709/246 |
| 6,418,448 B1 | 7/2002 | Sarkar | |
| 6,571,232 B1 | 5/2003 | Goldberg et al. | |
| 6,591,260 B1 | 7/2003 | Schwarzhoff et al. | |
| 6,704,744 B1 | 3/2004 | Williamson et al. | |
| 6,732,095 B1 | 5/2004 | Warshavsky et al. | |
| 6,732,109 B2 | 5/2004 | Lindberg et al. | |
| 6,745,382 B1 | 6/2004 | Zothner | |
| 6,789,252 B1 | 9/2004 | Burke et al. | |
| 6,820,135 B1 | 11/2004 | Dingman et al. | |
| 6,912,538 B2 | 6/2005 | Stapel et al. | |
| 6,996,568 B1 | 2/2006 | Bedell et al. | |
| 7,031,956 B1 | 4/2006 | Lee et al. | |

(Continued)

FOREIGN PATENT DOCUMENTS
WO 9909494 2/1999
(Continued)

OTHER PUBLICATIONS

XML Spy Suite 4.3 User and Reference Manual Version 4.3 (hereafter "XMLSPY") available at http://web.archive.org/web/20030411185500/http://www.altova.com/download/43/SpyManual43.pdf (published on Feb. 7, 2002) (archived on Apr. 11, 2003).*

(Continued)

*Primary Examiner* — Charles Rones
*Assistant Examiner* — Harold Hotelling
(74) *Attorney, Agent, or Firm* — Yee & Associates, P.C.; Prentiss W. Johnson (57) ABSTRACT

Provided is a method, for using schemas to generate application specific business objects for use in an integration broker. A schema is accessed defining an application specific data structure for one application. A business object is generated including fields corresponding to elements and attributes indicated in the accessed schema. A determination is made of application specific information for the generated business object indicating a correspondence of the fields in the business object to the application specific data structure. The business object is written out with the determined application specific information in a format that is understandable to an integration broker that communicates business objects to a plurality of applications, wherein the business object is capable of being processed by an adapter enabling communication with the application for which the accessed schema is provided.

18 Claims, 5 Drawing Sheets

U.S. PATENT DOCUMENTS

| | | | |
|---|---|---|---|
| 7,096,224 | B2 | 8/2006 | Murthy et al. |
| 7,152,073 | B2 | 12/2006 | Gudbjartsson et al. |
| 7,194,733 | B2 | 3/2007 | Ringseth et al. |
| 7,386,562 | B2 * | 6/2008 | Long .............................. 707/694 |
| 7,490,093 | B2 | 2/2009 | Jain et al. |
| 2002/0063734 | A1 | 5/2002 | Khalfay et al. |
| 2002/0107889 | A1 | 8/2002 | Stone et al. |
| 2002/0120859 | A1 | 8/2002 | Lipkin et al. |
| 2002/0147606 | A1 | 10/2002 | Hoffmann et al. |
| 2003/0023604 | A1 | 1/2003 | O'Brien et al. |
| 2003/0028540 | A1 | 2/2003 | Lindberg et al. |
| 2003/0065533 | A1 | 4/2003 | Scheinkman |
| 2003/0097383 | A1 | 5/2003 | Smirnov et al. |
| 2003/0135825 | A1 | 7/2003 | Gertner et al. |
| 2003/0163603 | A1 | 8/2003 | Fry et al. |
| 2003/0167358 | A1 | 9/2003 | Marvin et al. |
| 2003/0167456 | A1 | 9/2003 | Sabharwal |
| 2003/0182364 | A1 | 9/2003 | Large et al. |
| 2003/0195762 | A1 | 10/2003 | Gleason et al. |
| 2003/0204481 | A1 | 10/2003 | Lau |
| 2003/0217044 | A1 | 11/2003 | Zhang et al. |
| 2003/0229665 | A1 | 12/2003 | Ryman |
| 2004/0045005 | A1 | 3/2004 | Karakashian |
| 2004/0054969 | A1 | 3/2004 | Chiang et al. |
| 2004/0064804 | A1 | 4/2004 | Daniels et al. |
| 2004/0073870 | A1 | 4/2004 | Fuh et al. |
| 2004/0078802 | A1 | 4/2004 | Hammer et al. |
| 2004/0093344 | A1 | 5/2004 | Berger et al. |
| 2004/0111525 | A1 | 6/2004 | Berkland et al. |
| 2004/0111533 | A1 | 6/2004 | Beisiegel et al. |
| 2004/0123048 | A1 | 6/2004 | Mullins et al. |
| 2004/0133445 | A1 | 7/2004 | Rajan et al. |
| 2004/0133580 | A1 | 7/2004 | Liu et al. |
| 2004/0139095 | A1 | 7/2004 | Trastour et al. |
| 2004/0148612 | A1 * | 7/2004 | Olsen ............................ 719/328 |
| 2004/0167894 | A1 | 8/2004 | Ziv |
| 2004/0194016 | A1 | 9/2004 | Liggitt |
| 2004/0267808 | A1 | 12/2004 | Matsushima |
| 2005/0114394 | A1 | 5/2005 | Kaipa et al. |
| 2005/0149552 | A1 | 7/2005 | Chan et al. |
| 2005/0193035 | A1 | 9/2005 | Byrne |
| 2005/0240569 | A1 | 10/2005 | Cheng et al. |
| 2005/0257193 | A1 | 11/2005 | Falk et al. |
| 2005/0278358 | A1 | 12/2005 | Doughan |
| 2006/0064667 | A1 * | 3/2006 | Freitas ........................... 717/104 |
| 2006/0123030 | A1 | 6/2006 | Musteata et al. |

FOREIGN PATENT DOCUMENTS

WO        WO 9909494 A1 * 2/1999

OTHER PUBLICATIONS

Amagasa, T., M. Yoshikawa, and S. Uemura, "Realizing Temporal XML Repositories using Temporal Relational Databases", *Proceedings of the Third International Symposium on Cooperative Database Systems for Advanced Applications,* Apr. 2004, pp. 60-64.

Connor, M.D., J. Delmonaco, and L. England, "IBM WebSphere Studio Asset Analyzer. Overview", Jun. 2001, pp. 1-10.

Ha, S. and K. Kim, "Mapping XML Documents to the Object-Relational Form", *Proceedings of the IEEE International Symposium on Industrial Electronics,* Jun. 2001, pp. 1757-1761.

Kahm, L., "Using WebSphere Studio Asset Analyzer", *IBM Redbooks,* Mar. 2004, First Edition, Ch. 1, pp. 1-34.

Trad, A. and D. Kalpic, "Building a XML Based Object Mapping System (OMS)", *Proceedings of the 23$^{rd}$ International Conference on Information Technology Interfaces,* Jun. 2001.

US Patent Application, filed Apr. 8, 2005, entitled "Method and Apparatus for Mapping Web Services Definition Language Files to Application Specific Business Objects in an Integrated Application Environment", invented by Y. Kosov and T. Pollinger.

US Patent Application, filed Apr. 8, 2005, entitled "Method and Apparatus for Object Discovery Agent Based Mapping of Application Specific Markup Language Schemas to Application Specific Business Objects in an Integrated Application Environment", invented by Y. Kosov and T. Pollinger.

US Patent Application, filed Apr. 8, 2005, entitled "Method and Apparatus for Mapping Structured Query Language Schema to Application Specific Business Objects in an Integrated Application Environment", invented by T. Pollinger.

"User and Reference Manual Version 4.3", Feb. 7, 2002, pp. 2, 6, 10, 30, 63, 115, 334-337, 354, 358, 503, Altova. http://web.archive.org/web/20030411185500/http://www.altova.com/download/43/SpyManual43.pdf.

"User and Reference Manual Version 4.3", Feb. 7, 2002, pp. 12, 27, 73-74, 76-78, 80, 82, 103-104, 199-200, 244-245, Altova. http://web.archive.org/web/20030411185500/http://www.altova.com/download/43/SpyManual43.pdf.

* cited by examiner

USING SCHEMAS TO GENERATE APPLICATION SPECIFIC BUSINESS OBJECTS FOR USE IN AN INTEGRATION BROKER

BACKGROUND OF THE INVENTION

1. Field of the Invention

The present invention relates to using schemas to generate application specific business objects for use in an integration broker.

2. Description of the Related Art

In an integrated application environment, an integration server enables data to be integrated among heterogeneous applications and the business data objects used by the heterogeneous applications. The integration server maintains a mapping for each application specific business object maintained in the integrated application environment that defines how the data in an application specific business object maps to a generic business object. In this way, data may be integrated among heterogeneous applications by transforming data from a source application specific business object to a generic business object and then from the generic business object to a target application specific business object. In this way data generated and maintained by a source application may be integrated with a target application.

Before the mapping can be generated, the user or developer of the integrated application environment needs to determine the definition and format of the business objects and then provide that definition to the integration server to generate the mappings. In the current art, schema are used to generate XML specific business objects and the XML specific business objects are limited to use by an XML application adapter.

SUMMARY

Provided is a method, for using schemas to generate application specific business objects for use in an integration broker. A schema is accessed defining an application specific data structure for one application. A business object is generated including fields corresponding to elements and attributes indicated in the accessed schema. A determination is made of application specific information for the generated business object indicating a correspondence of the fields in the business object to the application specific data structure. The business object is written out with the determined application specific information in a format that is understandable to an integration broker that communicates business objects to a plurality of applications, wherein the business object is capable of being processed by an adapter enabling communication with the application for which the accessed schema is provided.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
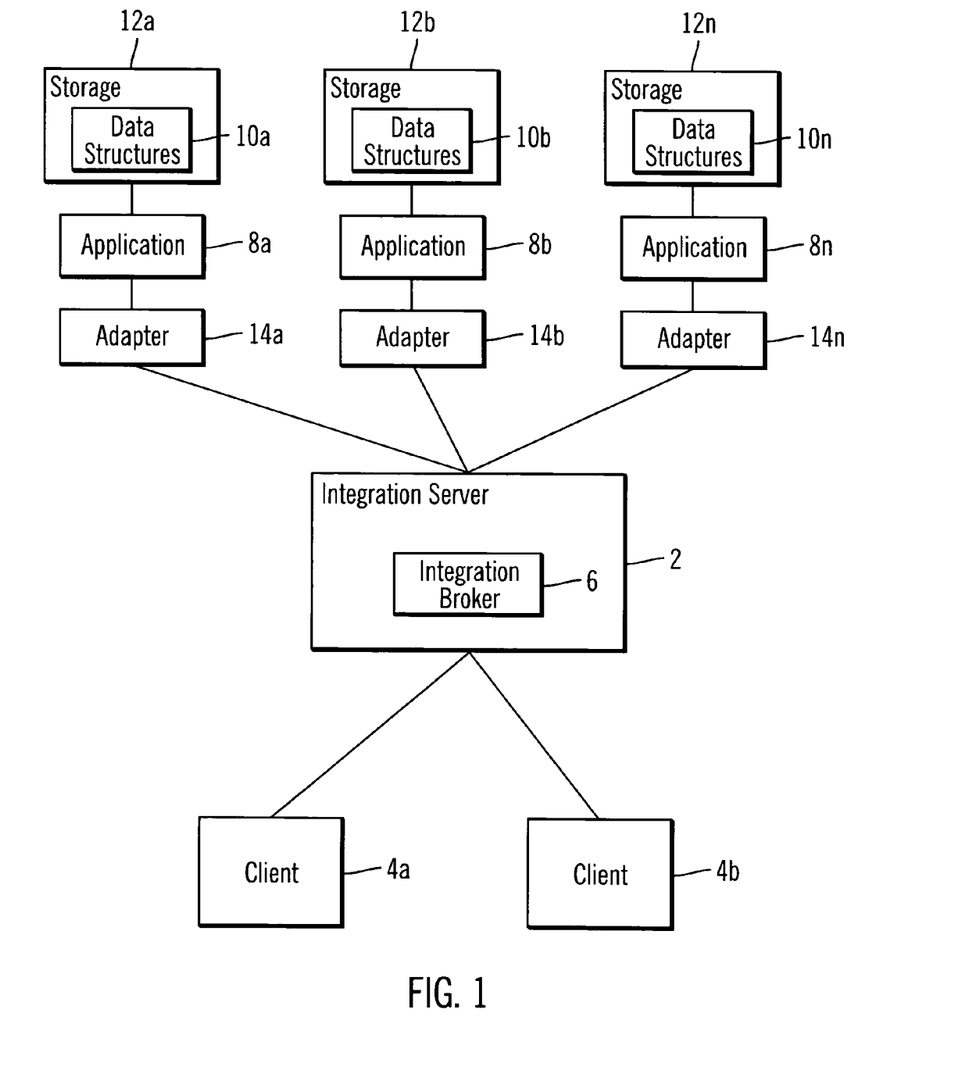
FIG. 1 illustrates an integrated application environment.

FIG. 1 illustrates an integrated application environment comprising an integration server 2 and client systems 4a, 4b that connect over a network (not shown). The integration server 2 includes an integration broker 6 providing integration services to allow the transfer of data in application specific business objects among applications 8a, 8b. . . 8n. The applications 8a, 8b. . . 8n maintain data in application specific data structures 10a, 10b. . . 10n, such as vendor specific databases, maintained in storages 12a, 12b. . . 12n. For each application 8a, 8b. . . 8n, an adapter 14a, 14b. . . 14n, respectively, is provided to transfer data between application specific business objects and the application specific data structures 10a, 10b. . . 10n. Certain applications may not have an associated storage, such as applications that monitor and measure parameters and transmit the information to the integration broker 6, such as an application that produces temperature measurements. The integration broker 6 may access data maintained in one source application specific data structure 10a, 10b. . . 10n through the adapter 14b. . . 14n and transform the source application data to a business object to transfer to an application specific business object for a target application that may be then provided to the adapter for the target application to transform to a target application specific data structure. The applications 8a, 8b, 8c may communicate with the integration broker 6 over the network or execute on the same system in which the integration broker 6, and thus communicate via inter-process communication techniques. For instance, the applications 8a, 8b, 8c may be the embodiment of simple files on a file system, e.g., reading text files from the file system.

Figure 2:
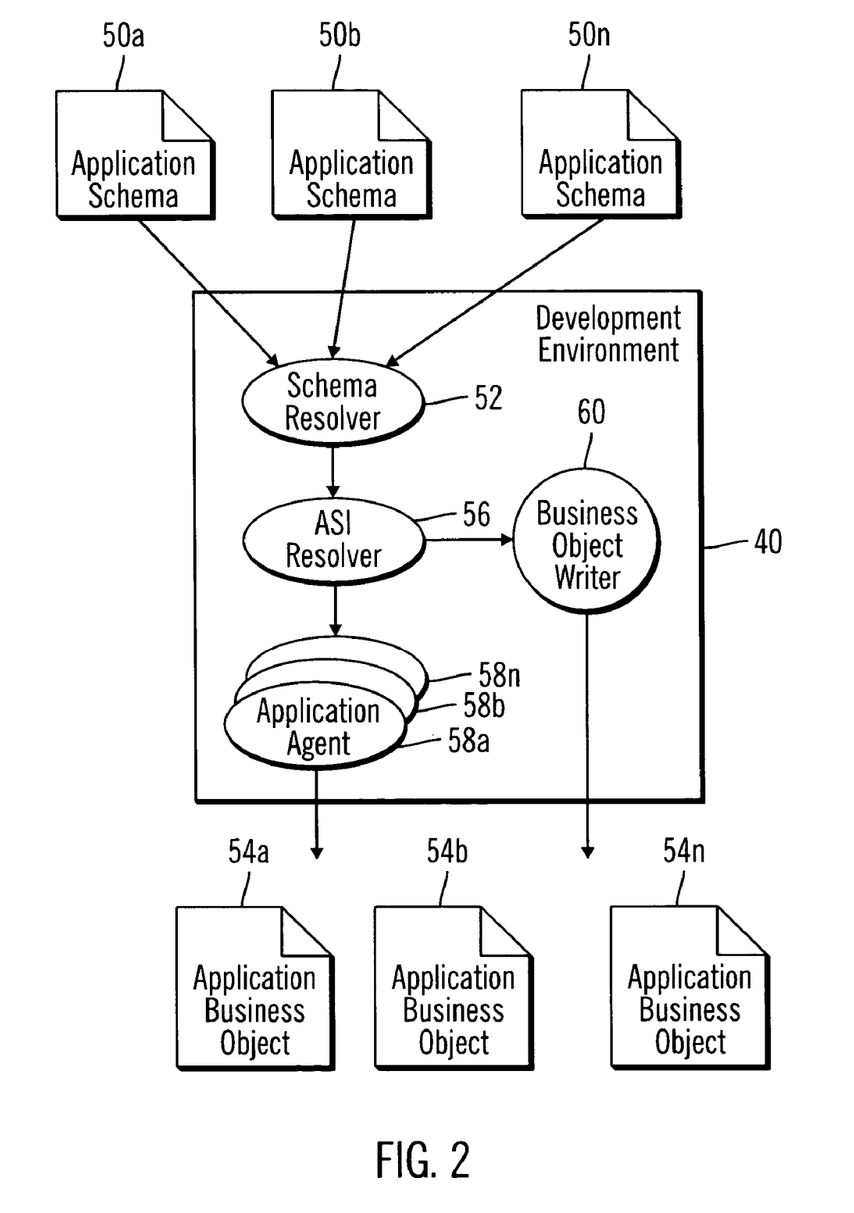
FIG. 2 illustrates an embodiment of components of the integration broker.

FIG. 2 illustrates components of a development environment 40 that may be implemented in the integration server 2 in addition to the integration broker 6. Schemas 50a, 50b. . . 50n, such as XML schemas, are provided to define the structure and format of the application specific data structures 10a, 10b . . . 10n. A schema resolver 52 parses the schemas 50a, 50b. . . 50n and generates a base structure for an application specific business object 54a, 54b. . . 54n being generated. An application specific information (ASI) resolver 56 interprets the schemas 50a, 50b. . . 50n to populate an application specific information (ASI) field in the application specific business object 54a, 54b. . . 54n being generated. The ASI resolver 56 may service many type of application schemas for which an object discovery agent exists, not just those in XML. The ASI resolver 56 may call an application specific application agent program 58a, 58b. . . 58n, such as an object discovery agent, to add information to the ASI field or generate additional classes that are used to access and manipulate the application specific business object 54a, 54b. . . 54n. The ASI resolver 56 may comprise an extensible system that allows the calling of specific ASI resolvers that are able to interpret a particular form of a schema definition. A business object writer 60 populates the generated application specific business object with data to format and finalize the business object for use by the integration broker 6.

Figure 3:
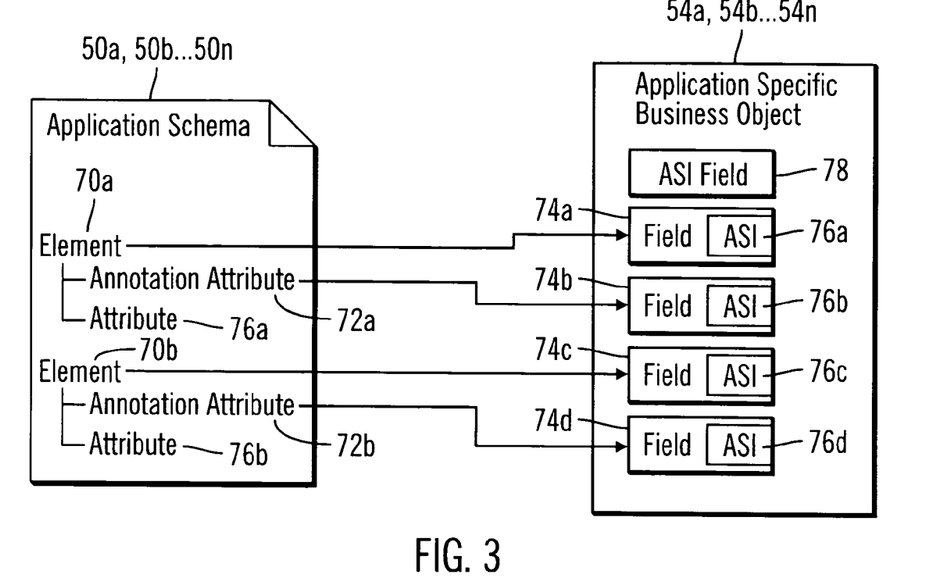
FIG. 3 illustrates an embodiment of how an application schema maps to fields in an application specific business object.

FIG. 3 illustrates an embodiment of how the definition of a schema 50a. 50b. . . 50n may map to the definition of fields in an application specific business object 54a, 54b. . . 54n. The schema 50a, 50b. . . 50n defines a plurality of elements 70a, 70b, where each element may or may not have an attribute. In the embodiment of FIG. 3, each element 70a, 70b also includes an annotation attribute 72a, 72b that indicates a field in the application specific data structure 10a, 10b. . . 10n corresponding to the element and/or attribute defined in the schema 50a, 50b. . . 50n. There may be annotation attributes for each element and attribute, or one annotation attribute providing the mapping for an element and all attributes of that element. The application specific business object 54a, 54b. . . 54n further includes a business object level ASI field 78 that might derive from the schema target name space, the root element or other information (e.g. particular element definition or annotation element in the schema). The business object 54a, 54b. . . 54n includes fields 74a, 74b, 74c, 74d, where each field includes an ASI component 76a, 76b, 76c, 76d providing information on a correspondence of the field 74a, 74b, 74c, 74d to the application schema 50a, 50b, 50c, Each field of the business providing the mapping of the business object field to the corresponding field in the application specific data structure. For instance, elements 70a and 70b may map to the application specific fields 74a and 74d, respectively, or the ASI fields 76a, 76d. The annotation attributes 72a and 72b may map to fields 74b and 74d or ASI fields 76b and 76d.

The ASI information may be determined from the annotation attributes 72a, 72b in the schema 50a, 50b. . . 50n. The ASI information may be conveyed in formats other than annotation attributes. For instance, the ASI can be constructed based on conventions (e.g. element name corresponds to table name or column name), by schema comments, by schema annotations or some other way.

Figure 4:
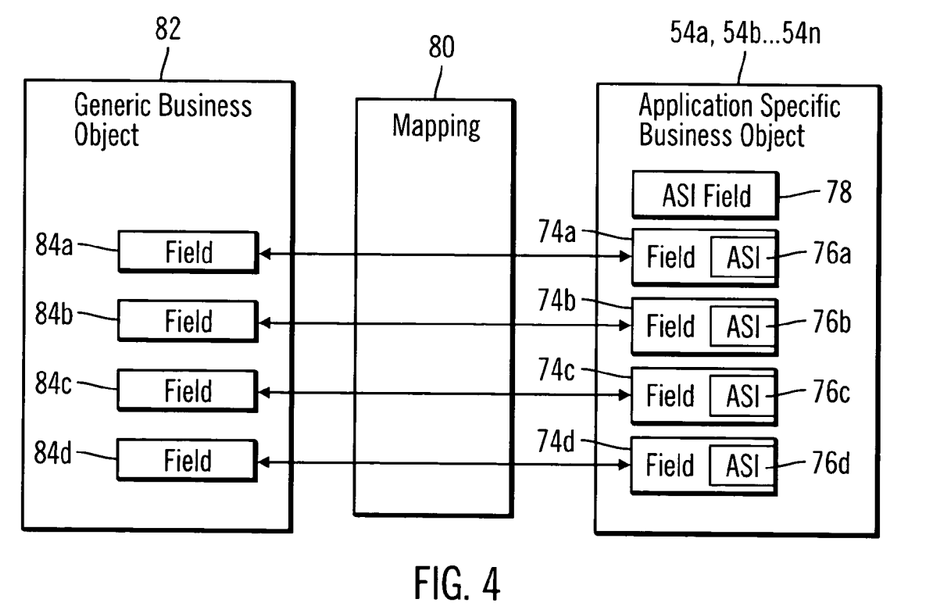
FIG. 4 illustrates an embodiment of how information in a generic business object maps to an application specific business object.

FIG. 4 illustrates an embodiment of how a mapping 80 provides a mapping between fields 84a, 84b, 84c, 84d in a generic business object 82, which may be manipulated and used by the integration broker 6, and the fields in an application specific business object 54, such as one of the application specific business objects 54a, 54b. . . 54n. There may be a separate mapping 80 for each application specific business object type to provide a mapping to a generic business object that is used by the integration broker 6 in various integration broker services, such as messaging, workflow, etc.

In one embodiment, XML attributes may map to the corresponding business object field. Also, XML elements may map to a business object if the element describes a complex type, otherwise it may map to a business object field. Annotation elements, such as comments, naming conventions on either the attribute or element name, naming conventions on either a complex type and/or a simple type or extension elements may map to their corresponding field level ASI information or business object level ASI if the annotation applies to the business object as a whole. Parts of the target namespace or other top level annotation objects may map to the business object level ASI. In certain embodiments, annotation or other schema elements other than XML elements and XML attributes may not map to a business object or business object field, and instead may map to their corresponding ASI field. Alternatively, XML elements and attributes may map to business objects and business object fields and may also map to their corresponding ASI fields.

Figure 5:
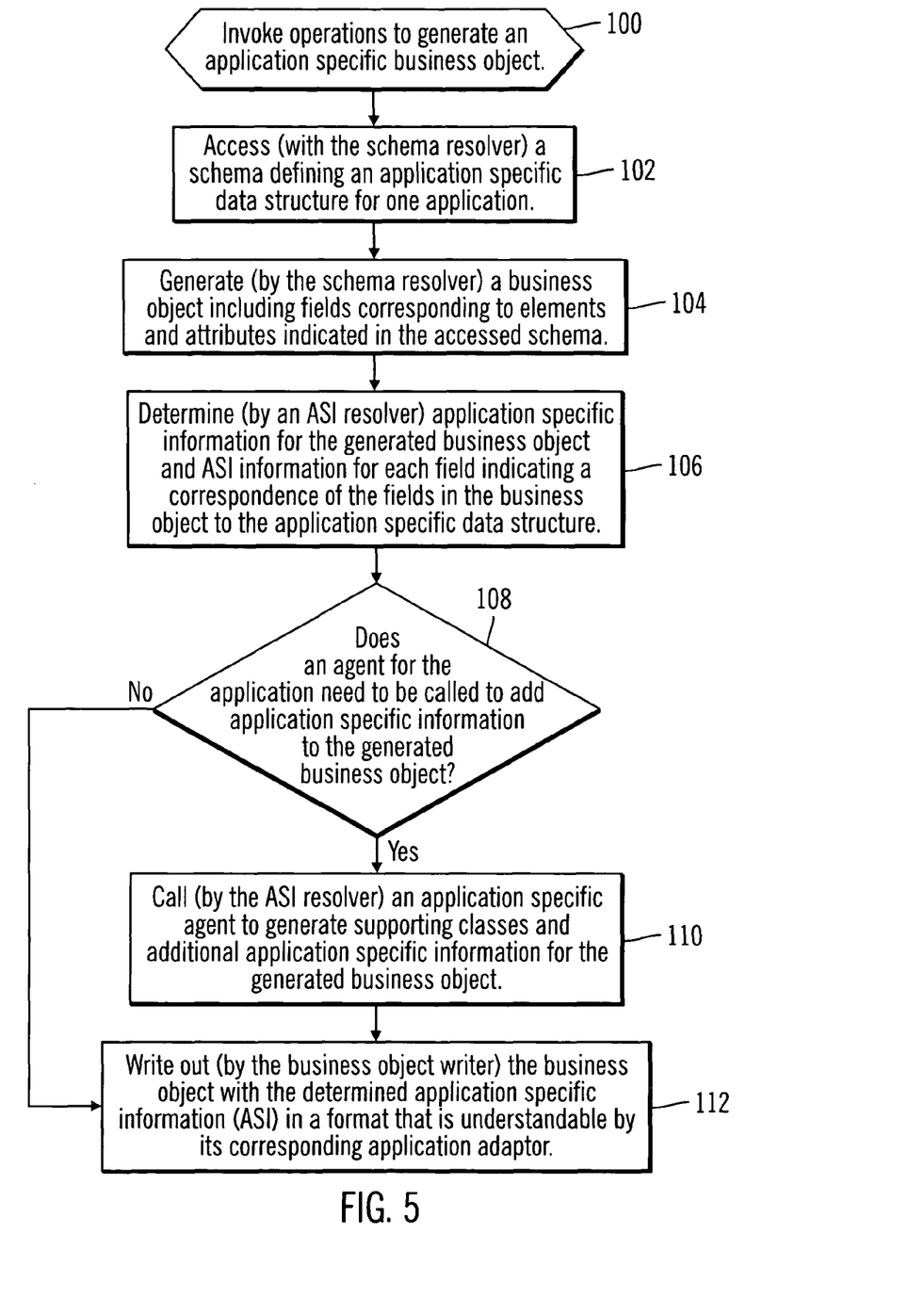
FIG. 5 illustrates an embodiment of operations to generate an application specific business object using a schema.

FIG. 5 illustrates an embodiment of operations to generate an application specific business object implemented in the components of the integration broker 6 during a development time. These objects are then later used in a runtime mode to transfer data among applications. Upon invoking (at block 100) operations to generate an application specific business object 54a, 54b. . . 54n (FIG. 2), the schema resolver 52 accesses (at block 102) a schema 50a, 50b. . . 50n defining an application specific data structure 10a, 10b. . . 10n (FIG. 1) for one application 8a, 8b. . . 8n. The schema resolver 52 then generates (at block 104) a business object including fields, e.g., 74a, 74b, 74c, 74d, corresponding to elements 70a, 70b and attributes 72a, 72b indicated in the accessed schema 50a, 50b. . . 50n. The ASI resolver 56 determines (at block 106) business object level application specific information 78 and application specific information (ASI) 76a, 76b, 76c, 76d for each field 74a, 74b, 74c, 74d in the generated business object 54 indicating a correspondence of the fields 74a, 74b, 74, 74d in the business object and the application specific data structure 10a, 10b. . . 10n, which is defined by the element/attribute arrangement in the application schema 50a, 50b. . . 50n. The ASI resolver 56 may interpret the accessed schema and the annotation attribute information to determine the ASI information. If (at block 108) the ASI resolver 52 determines that an agent for the application 8a, 8b. . . 8n needs to be called to add application specific information (ASI) to the generated business object 54, then the ASI resolver 52 calls (at block 110) an application specific agent 58a, 58b. . . 58n, such as an Object Discovery Agent (ODA), to generate supporting classes and any additional application specific information for the generated business object. The supporting classes and additional information may be needed by the application specific adapter 14a, 14b. . . 14n to process the business object for the application 8a, 8b. . . 8n associated with the adapter 14a, 14b. . . 14n. From block 108 or 110, the business object writer 60 writes out (at block 112) the business object 54 with the determined application specific information (ASI) in a format that is understandable to an adapter 14a, 14b. . . 14n interfacing between the integration broker 6 and the applications 8a, 8b. . . 8n and their data structure 10a, 10b. . . 10n formats. The application specific business object can be processed by the adapter 14a, 14b. . . 14n for the application for which the schema is provided. The adapter 14a, 14b. . . 14n is on the application side and does the conversion from business object to/from application specific data (XML, database access, IDOC access on SAP, PeopleSoft, custom protocol, custom format, a file system, text files, etc.).

During development time, the operations of FIG. 5 are performed to generate source and target application specific objects, the mappings 80, and other artifacts used by the integration broker 6 and application adapters 14a, 14b. . . 14n during runtime to transfer data among application specific business objects 54a, 54b. . . 54n. Further, during development time, the components in the development environment 40 build generic business objects by using a schema, by reusing existing generic objects, manually, or by using an application agent 58a, 58b. . . 58n, and then removing any ASI information. During development time, the mappings, such as shown in FIGS. 3 and 4 would be developed to map between source and target applications and a generic business object. These generated objects, mappings and other information, such as a synchronization, are then deployed for use during runtime by the integration broker 6 and application adapters 14a, 14b. . . 14n.

Figure 6:
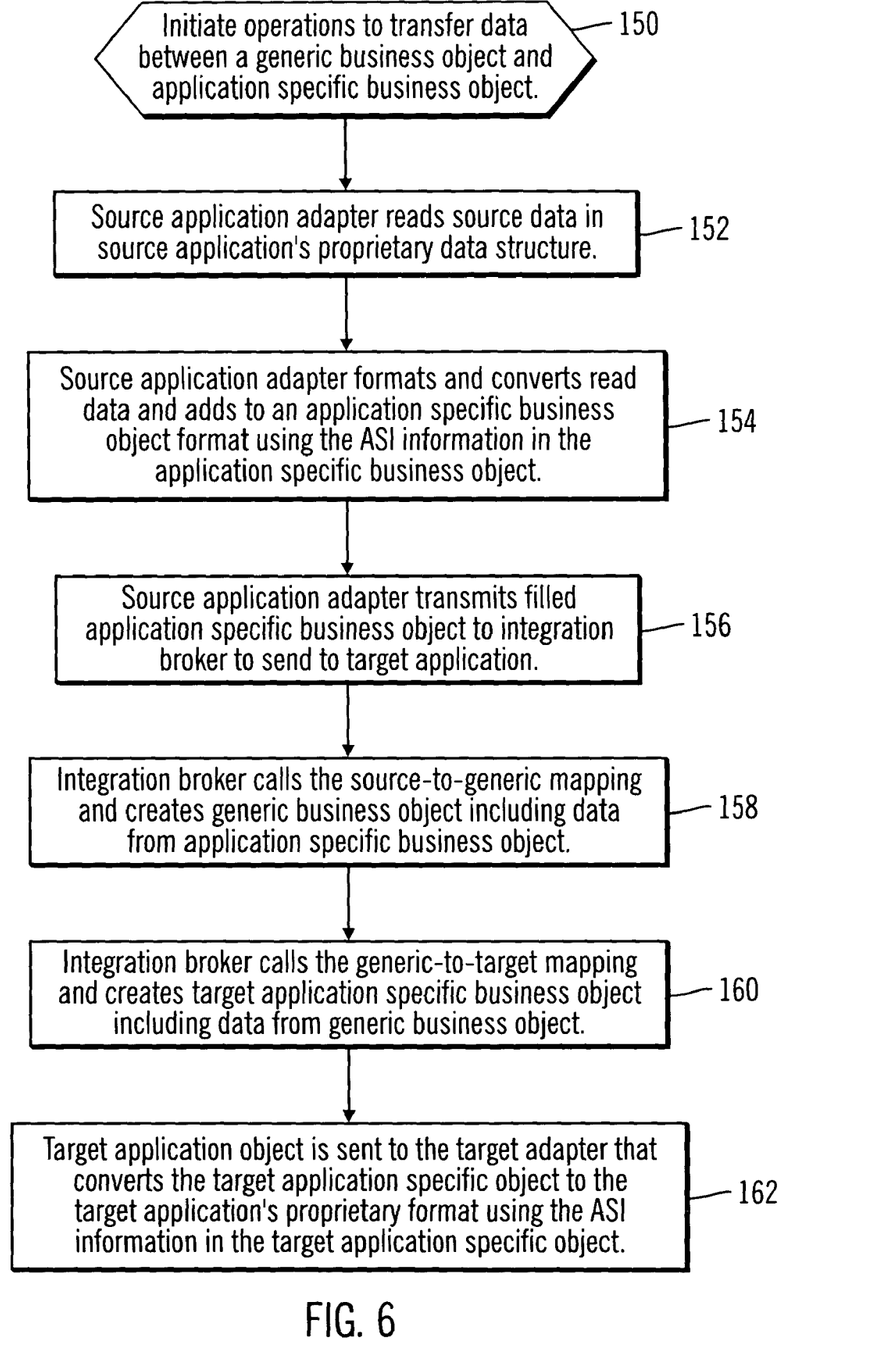
FIG. 6 illustrates an embodiment of operations to transfer data between a generic business object and an application specific business object.

FIG. 6 illustrates runtime operations to transfer data between a source and target applications 8a, 8b. . . 8n using the generic business objects, application specific business objects and mappings generated during the development time. To initiate this process (at block 150), a source application adapter, e.g., 14a, reads (at block 152) source data in the source application's proprietary data structure, e.g., 10a. The source application adapter 14 then formats and converts (at block 154) the read data and adds the data to an application specific business object using the ASI information 78 in the application specific business object, e.g., 54*a*. The source application adapter 14*a* then transmits (at block 156) the filled application specific business object 54*a* to the integration broker 6 to send to a target application, e.g., 8*b*. The integration broker 6 calls (at block 158) a source-to-generic mapping 80 and creates a generic business object 82 including data from application specific business object 54*a*. The integration broker 6 then calls (at block 160) the generic-to-target mapping for the target application and creates a target application specific business object, e.g., 54*b*, including data from the generic business object 82. The integration broker 6 then sends the target application specific object 54*b* to the target adapter, e.g., 14*b*. The target adapter 14*b* converts (at block 162) the target application specific object 54*b* to the target application's proprietary data structure format, e.g., 10*b*, using the ASI information 78 in the target application specific object 54*b*.

Described embodiments provide techniques to create application specific business objects from schemas providing information on the application specific data structures. An integration broker may then transfer data between application specific business objects for heterogeneous applications from different vendors that maintain data in different application specific data formats. The integration broker may maintain data from application specific business objects in a generic business object format and then transfer the data using application specific mappings to one or more application specific business objects that may then be transferred to the application specific data format by an application adapter. The described embodiments enable the transfer of data among heterogeneous applications from different vendors that maintain data in heterogeneous application specific data formats.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The integration server 2 may comprise a separate computer system from one or more systems (not shown) including the applications 8*a*, 8*b*. . . 8*n*. The adapters 14*a*, 14*b*. . . 14*n* may be implemented within the integration server 2 system. The storage 12*a*, 12*b*. . . 12*n* including the application data structures 10*a*, 10*b*. . . 10*n* may be distributed among storage devices or within a single storage device. The clients 4*a*, 4*b* may comprise separate computing systems used by users to provide data to interact with the integration broker 6. Any computer system implementing the integration server 2, the applications 8*a*, 8*b*. . . 8*n*, and the clients 4*a*, 4*b* may comprise a single computer system or a distributed computing environment.

FIG. 2 provides an embodiment of components in the integration broker that perform specific operations with respect to generating an application specific business object from a schema. In alternative embodiments, certain of the operations described as performed by the components in FIG. 2 may be performed by different or alternative components employed by the integration broker.

The illustrated operations of FIGS. 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for transferring data between a source business object and a target business object, comprising:

providing a plurality of components for creation of business objects in an XML schema, the plurality of components including a schema resolver, an application specific information resolver, a business object writer, and a business object reader, wherein the plurality of components cooperate to enable a business integration broker to transfer data between a plurality of application specific business objects for a plurality of different applications in a plurality of different application specific formats;

using the plurality of components to perform actions comprising:

accessing, by the schema resolver, the XML schema defining a source application specific data structure for a source application;

generating, by the schema resolver, a source business object including a plurality of fields corresponding to one or more elements and one or more attributes indicated in the XML schema and including at least one business object level application specific information field derived from a particular element definition in the XML schema and a particular annotation element in the XML schema, and, within each particular field of the plurality of fields, including a corresponding application specific information component field;

determining, by the application specific information resolver, source application specific information;

adding the particular element definition and the particular annotation element to the business object level application specific information field and adding to each corresponding application specific information component field, an information on the correspondence of the particular field to the XML schema;

determining, by the application specific information resolver, source application specific information for the source business object indicating a correspondence of the fields in the source business object to the source application specific data structure, wherein a source adaptor processes the source application specific information to convert the data in the source business object to a source data structure format specific to the source application; and writing out the source business object, by the business object writer, with the source application specific information in a format that is understandable to an integration broker;

transforming, by the integration broker, the source business object to a target business object for a target application;

selecting a target adaptor associated with the target application from a plurality of target adaptors each of which is associated with a different target application of a plurality of target applications, wherein the target adaptor enables communication with the target application; and processing, by the target adaptor, the target business object to convert data in the target business object to a target application specific data structure used by the target application.

2. The computer implemented method of claim 1, further comprising:
calling, by the application specific information resolver, an application specific agent to generate supporting classes and additional source application specific information for the source business object, wherein the supporting classes and additional source application specific information are used by a source adapter to transfer data in the source business object to the source application.

3. The computer implemented method of claim 1, further comprising:
determining, by the application specific information resolver, that an agent for the source application needs to be called to add the source application specific information to the source business object; and
calling, by the application specific information resolver, the agent for the source application to add the source application specific information to the source business object and generate any supporting classes needed by the source adapter for the source application to process the source business object.

4. The computer implemented method of claim 1, further comprising:
receiving data; and
adding the data to a generic business object used by the integration broker.

5. The computer implemented method of claim 4, further comprising:
using, by the integration broker, a target mapping for the target application to map the received data from the generic business object to the target business object; and transferring the target business object including the data from the generic business object to the target adapter for the target application, wherein the target adapter transfers the data to the target application in a target application data format.

6. The computer implemented method of claim 1, further comprising:
using, by the integration broker, a source mapping for the source application to map data in the source business object to a generic business object used by the integration broker; and
using, by the integration broker, a target mapping for application to map the data from the generic business object to target business object capable of being processed by the target adapter.

7. The computer implemented method of claim 6, wherein the schema for the source application comprises a source schema, wherein the target business object is created by:
accessing a target schema defining the target application specific data structure for the target application;
generating the target business object including fields corresponding to elements and attributes indicated in the target schema; and
adding target application specific information to the target business object indicating a mapping from the fields in the business object to the target application specific data structure.

8. The computer implemented method of claim 1, wherein the source application comprises a database and the source application specific data structure comprises a database table, and wherein the source application specific information defines a correspondence of fields in the source business object with a database table and columns and/or rows in the database table.

9. A system comprising:
at least one processor connected to a computer readable memory and to a computer readable storage;
first program instructions for defining an XML schema containing a structure and a format of a plurality of application specific data structures using a plurality of complex type elements, a plurality of simple type elements, and a plurality of attributes, wherein where each complex or simple type element may or may not have an attribute;
second program instructions for loading, parsing, and resolving the XML schema to generate a base structure of an application specific business object;
third program instructions for generating, by a schema resolver, a source business object including a plurality of fields corresponding to one or more elements and one or more attributes indicated in the XML schema and including at least one business object level application specific information field derived from a particular element definition in the XML schema and a particular annotation element in the XML schema, and within each particular field of the plurality of fields including a corresponding application specific information component field, wherein the particular element definition maps to a business object, a business object field, and at least one first application specific information field and the particular annotation element maps to at least one second application specific information field;

fourth program instructions for determining, by an application specific information resolver, a plurality of source application specific information;

fifth program instructions for adding the particular element definition and the particular annotation element to the business object level application specific information field and adding to each corresponding application specific information component field, an information on the correspondence of the particular field to the XML schema; and sixth program instructions for populating, responsive to resolving each application specific information field of the application specific information data structures of the XML schema, the application specific business object with a mapping of each application specific information field to each element and attribute of the application specific business object;

wherein the first through the sixth program instructions are stored in the computer readable storage for running via the computer readable memory.

10. The system of claim 9, wherein the sixth program instructions for populating the application specific business objects further comprise:

seventh program instructions for adding either an annotation attribute providing a mapping for each element and each attribute to each associated application specific information field, or adding one annotation attribute providing a mapping for an element and all attributes of that element;

wherein the seventh program instructions are stored in the computer readable storage for running via the computer readable memory.

11. The system of claim 9 further comprising:

wherein each annotation attribute is formed using a naming convention based on an attribute name, an element name, a complex type, and a simple type.

12. The system of claim 9 further comprising:

eighth program instructions for forming each annotation attribute using one or more extension elements mapped to a corresponding field level application specific information or to a corresponding business object level application specific information when an annotation applies to a business object as a whole; and ninth program instructions for forming, responsive to an annotation applying to a business object as a whole, the annotation attribute using one or more extension elements mapped to a corresponding business object level application specific information;

wherein the eighth and ninth program instructions are stored in the computer readable storage for running via the computer readable memory.

13. The system of claim 9 further comprising:

seventh program instructions for populating a top level of the applicant specific business object based by adding a plurality of annotation attributes at the top level of the application specific business object, providing mappings that apply to the application specific business object including top level application specific information at least including a target namespace of the application specific information, and including top level mappings to the application specific information that apply to the application specific business object;

wherein the seventh program instructions are stored in the computer readable storage for running via the computer readable memory.

14. A computer program product comprising:

a computer readable storage device;

first program instructions for defining an XML schema containing a structure and a format of a plurality of application specific data structures using a plurality of complex type elements, a plurality of simple type elements, and a plurality of attributes, wherein where each complex or simple type element may or may not have an attribute;

second program instructions for loading, parsing, and resolving the XML schema to generate a base structure of an application specific business object;

third program instructions for generating, by a schema resolver, a source business object including a plurality of fields corresponding to one or more elements and one or more attributes indicated in the XML schema and including at least one business object level application specific information field derived from a particular element definition in the XML schema and a particular annotation element in the XML schema, and within each particular field of the plurality of fields including a corresponding application specific information component field, wherein the particular element definition maps to a business object, a business object field, and at least one first application specific information field and the particular annotation element maps to at least one second application specific information field;

fourth program instructions for determining, by an application specific information resolver, a plurality of source application specific information;

fifth program instructions for adding the particular element definition and the particular annotation element to the business object level application specific information field and adding to each corresponding application specific information component field, an information on the correspondence of the particular field to the XML schema;

sixth program instructions for populating, responsive to resolving each application specific information field of the plurality of application specific information data structures of the XML schema, the application specific business object with a mapping of each application specific information field to each element and attribute of the application specific business object;

wherein the first through the sixth program instructions are stored in the computer readable storage device.

15. The computer program product of claim 14, wherein the sixth program instructions for populating application specific business information data structures further comprise:

seventh program instructions for adding either an annotation attribute providing a mapping for each element and each attribute to each associated application specific information field, or adding one annotation attribute providing a mapping for an element and all attributes of that element;

wherein the seventh program instructions are stored in the computer readable storage device.

16. The computer program product of claim 14 further comprising:

wherein each annotation attribute is formed using a naming convention based on an attribute name, an element name, a complex type, and a simple type.

17. The computer program product of claim 14 further comprising:
- eighth program instructions for forming each annotation attribute using one or more extension elements mapped to a corresponding field level application specific information or to a corresponding business object level application specific information when an annotation applies to a business object as a whole; and
- ninth program instructions for forming, responsive to an annotation applying to a business object as a whole, each annotation attribute using one or more extension elements mapped to a corresponding business object level application specific information;
- wherein the eighth and ninth program instructions are stored in the computer readable storage device.

18. The computer program product of claim 14 further comprising:
- seventh program instructions for populating a top level of the applicant specific business object based by adding a plurality of annotation attributes at the top level of the application specific business object, providing mappings that apply to the whole application specific business object including top level application specific information at least including a target namespace of the application specific information, and including top level mappings to the application specific information that apply to the whole application specific business object;
- wherein the seventh program instructions are stored in the computer readable storage device.

* * * * *